July 7, 1942.   J. C. PROVAN   2,289,296
IGNITION LOCKING MEANS
Filed July 31, 1940   3 Sheets-Sheet 1

Inventor
J. C. Provan
by J. Edw. Maybee
ATTY.

July 7, 1942.　　　　J. C. PROVAN　　　　2,289,296
IGNITION LOCKING MEANS
Filed July 31, 1940　　　　3 Sheets-Sheet 2

Inventor
J. C. Provan
by J. Edw. Maybee
ATTY.

Patented July 7, 1942

2,289,296

UNITED STATES PATENT OFFICE 2,289,296

IGNITION LOCKING MEANS

Joseph C. Provan, Powassan, Ontario, Canada

Application July 31, 1940, Serial No. 348,748

11 Claims. (Cl. 123—146.5)

This invention relates to ignition locking means, and is particularly adapted for use with motor vehicles.

The object of this invention is to provide means for locking ignition systems of internal combustion engines to prevent the unauthorized use of the vehicles in which they are used. A further object is to provide means to give warning in case the ignition is tampered with.

The objects are attained by means of the constructions which may be briefly described as follows:

In shunt with the usual ignition circuit is a Wheatstone bridge having a manually operated switch in one of the branches thereof. In the cross branch of the Wheatstone bridge is a relay. Should the ignition circuit be energized without first closing or crossing the Wheatstone bridge switch, the bridge will become unbalanced thereby energizing the relay to open the ignition circuit and/or close an alarm circuit. At least one of the resistances of the Wheatstone bridge is made inaccessible to unauthorized persons by being located in a locked enclosure, such as the ignition lock casing or beneath the engine hood.

In order that the ignition circuit will remain open there may be provided a second circuit. The armature of the relay after opening the ignition circuit closes the second circuit which continues to energize the relay to keep the ignition circuit open. This second circuit may in addition to keeping the ignition circuit open include a warning signal and means for re-setting the relay. In series with the ignition circuit may be a further circuit for the purpose of operating an electromagnetic lock for the engine hood. The opening of the ignition circuit will render this lock inoperable.

Figure 1:
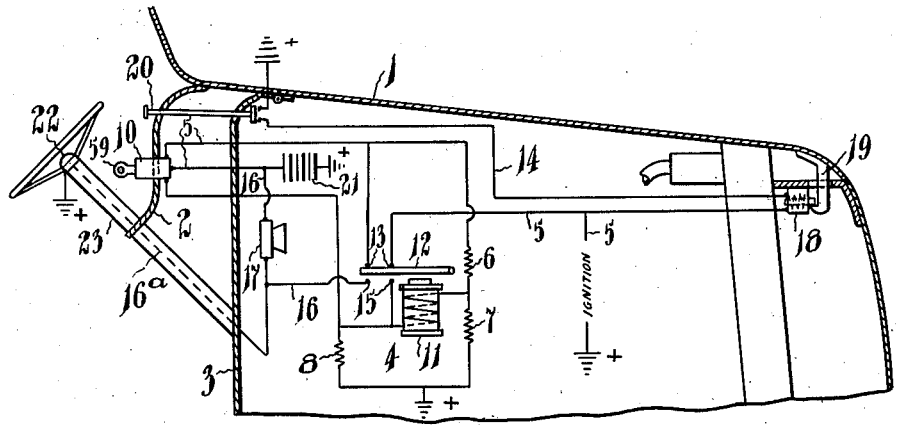
Figure 2:
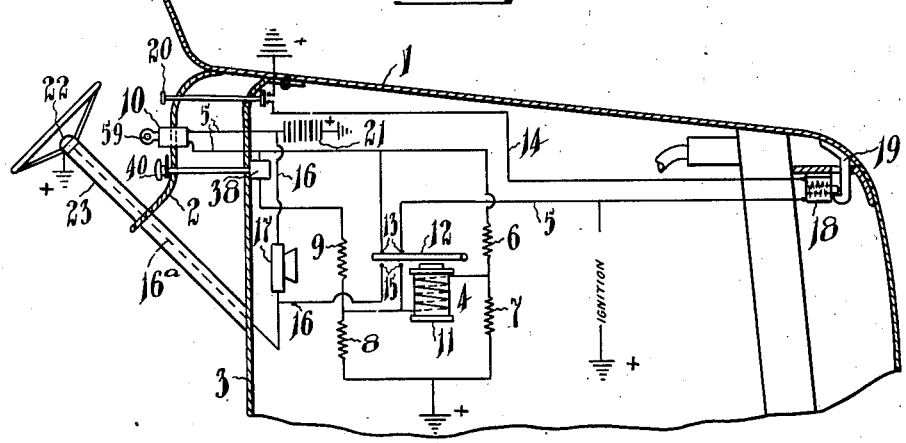
Figure 3:
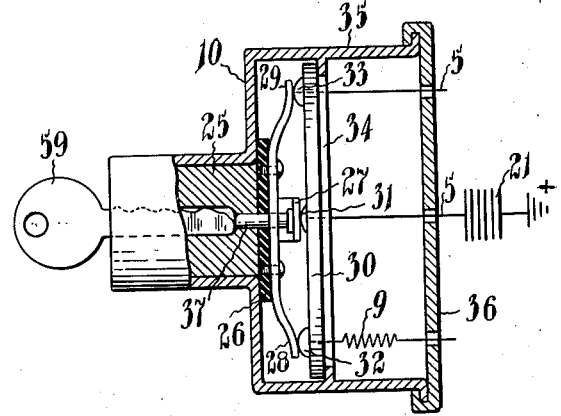
Figure 4:
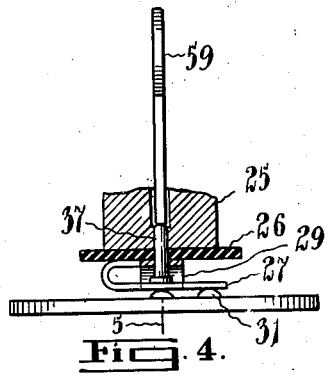
Figure 8:
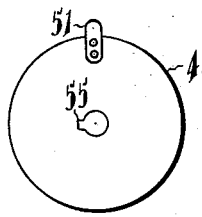
Figure 9:
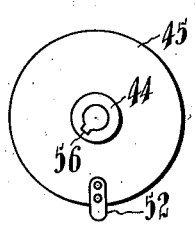
Figure 5:
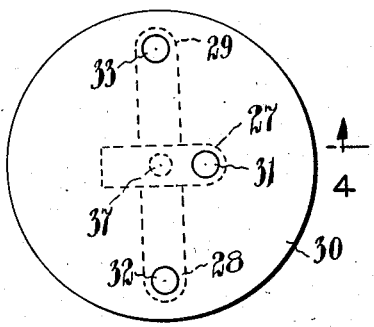
Figure 6:
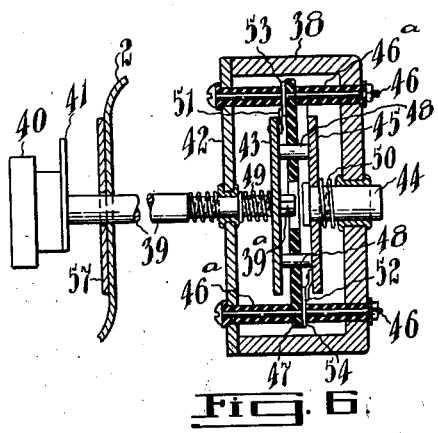
Figure 7:
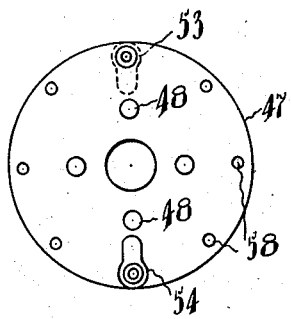
Figure 10:
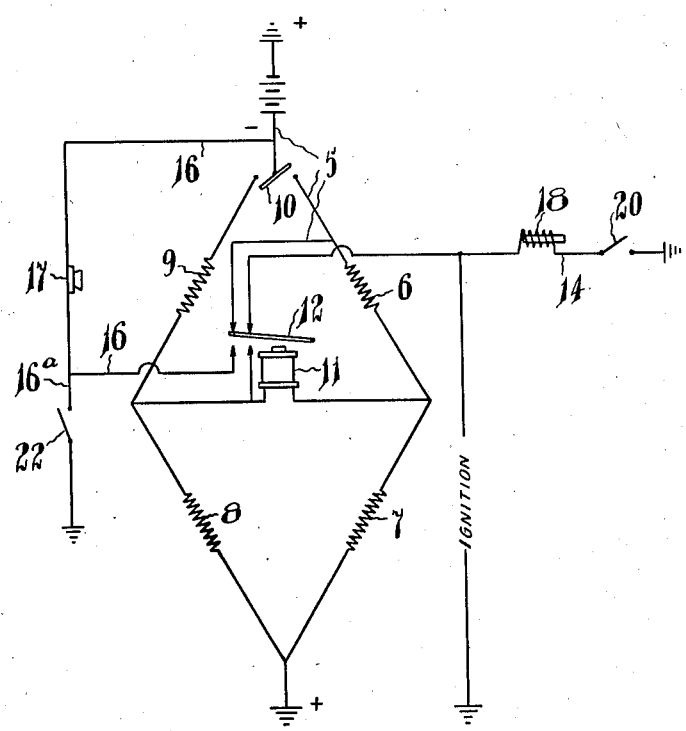

The invention is more fully described and is illustrated in the accompanying drawings in which Figure 1 is a sectional view partly broken away of the forward part of an automobile showing diagrammatically the wiring of my lock;

Figure 2 a similar view to Figure 1 showing the use of a combination lock switch in addition to the usual ignition switch lock;

Figure 3 a side view of the ignition switch partly in section;

Figure 4 a fragmentary section taken on line 4—4 in Figure 5;

Figure 5 a plan view of the switch contacts and contact holder;

Figure 6 a cross section of the combination switch;

Figure 7 a plan view of the stationary disk of the combination switch showing the fixed contacts and the adjustable contacts;

Figure 8 a plan view of the movable disk carried by the operating shaft of the combination switch;

Figure 9 a plan view of the disk carried by the stub shaft of the combination switch; and Figure 10 a simple circuit diagram of the form of the invention shown in Figure 1.

In the drawings like numerals of reference indicate the corresponding parts in the different figures.

In Figs. 1 and 2 is shown diagrammatically an engine hood 1 of a car, the instrument board 2, and the dashboard 3. Carried under the engine hood 1 is a Wheatstone bridge 4. This Wheatstone bridge 4 is in shunt with the ignition circuit 5. In Fig. 1 the resistors 6, 7 and 8 are located under the hood, and the resistor 9 is enclosed within the ignition switch 10. Forming the cross branch of the Wheatstone bridge is a relay 11 of which the armature 12 normally engages the contacts 13, 13 in the ignition circuit to close the circuit between the two contacts 13, 13 which form part of the ignition circuit 5.

Immediately below the contacts 13, 13 is a second pair of contacts 15, 15 which are engaged by the armature 12 when the coil of the relay 11 is energized. These contacts 15, 15 are in the circuit 16 which runs from the battery 21 to the coil of the relay 11, and has in series with it a warning device or horn 17. Connected in this circuit 16 by means of the wire 16ª is the usual horn operating or grounding switch 22 located on the steering column 23.

It will be noted that the circuit 16 can be completed either through the resistor 7 and the relay 11 and through the resistor 8 to ground or through the wire 16ª and switch 22 to ground.

A hood latch circuit 14 is connected in the ignition circuit 5 and in series with the ignition switch. Included in this circuit is an electromagnetic lock 18 consisting of a solenoid having a core which engages the hood latch 19 on the hood 1 when the circuit 14 is open. In order that every time the switch 10 is closed the electromagnetic lock will not operate to unlock the engine hood 1, there is provided a second switch 20 which must be closed before the circuit will be completed. It can be seen that unless the ignition circuit and the switch 20 are both closed, the electromagnetic lock will not operate to unlock the hood.

In Figs. 3, 4 and 5 is shown the ignition switch 10 having the usual type barrel 25 and key 59. Secured to the barrel 25 is an insulating disk 26 to which are secured the battery contact brush 27, the bridge contact brush 28, and the ignition contact brush 29. Carried by the flange 34 within the switch is a contact support 30 which carries the battery contact 31, the Wheatstone bridge contact 32 and the ignition contact 33. Secured to the housing 35 by any suitable means is a back 36 having holes therein for the wires of the circuit 5 and the Wheatstone bridge 4 to pass. Carried in the housing 35 and connected to the contact 32 is the resistor 9 of the Wheatstone bridge 4. Located centrally in and to the rear of the barrel 25 is a plunger 37 of insulating material which extends through the insulating disk 26 and through the junction of the brushes 27, 28 and 29 to engage the brush 27, which is bent back beneath the junction point of the three brushes.

The operation of the switch is as follows: When the key 59 is inserted in the barrel 25 of the lock 10 it engages the plunger 37 causing the brush 27 to engage the contact 31 to close the circuit between the battery 21 and the switch brushes. The barrel 25 is then rotated by the key 59 causing the brush 29 to engage the contact 33 and brush 28 to engage the contact 32 to close the ignition circuit as well as the Wheatstone bridge circuit.

In Fig. 1 if the ignition circuit 5 is closed by means other than the ignition switch 10, say by short circuiting the switch 10, the resistance 9 would be left out of the Wheatstone bridge 4 which would cause it to become unbalanced. The unbalancing of the bridge will cause the relay to become energized and cause the armature 12 to disengage the contacts 13 and engage the contacts 15 to cause the ignition circuit 5 to be opened and the alarm circuit 16 to be closed.

The opening of the ignition circuit 5 will prevent any flow of current through the ignition circuit or the electromagnetic lock 18. Therefore the electromagnetic lock 19 for the hood will not operate and no current will be supplied for the ignition and the motor will not start. The closing of the circuit 16 will cause a small flow of current from the battery 21 through the Wheatstone bridge 4 to ground as well as through the circuit 16 and the warning device 17. Since the resistance in the circuit 16 to ground would be greater than through the Wheatstone bridge 4, ordinarily there would not be sufficient flow through the warning device to operate it. However, if the short circuit in the line 5 was removed, the full electrical force of the battery 21 would be exerted in the circuit 16 causing sufficient current to pass to ground through the warning device 17 to operate it and through the relay 11 to cause it to remain energized and the armature 12 to remain in engagement with the contacts 15.

The operation of the warning device could only be stopped by balancing the Wheatstone bridge 4. The closing of the warning device operating switch 22 will close the circuit 16 from the warning device 17 to ground through the wire 16ª. Since the resistance through the wire 16ª to ground will be less than the resistance of the relay 11 and resistors 8 and 7 of the Wheatstone bridge 4 the relay 11 will become de-energized and the armature will again engage the contacts 13 to complete the ignition circuit 5 so that it can be closed or opened by the ignition switch, and the lock 18 operated by the switch 20 when the ignition switch is closed.

The construction as shown in Fig. 2 differs from that in Fig. 1 in that in Fig. 2 the resistance 9 is placed under the engine hood 1 and there is a combination lock switch 38 in one of the branches of the Wheatstone bridge. The locking mechanism of the switch being enclosed under the locked engine hood. If the ignition switch 10 is closed without first closing the combination lock switch the Wheatstone bridge will be unbalanced causing the relay 11 to become energized as already explained in connection with Fig. 1. The procedure for resetting the relay is exactly as described in relation to Fig. 1.

If the combination of the lock switch 38 is not known it can only be found by trial and error, that is by trying a combination and then closing the ignition circuit. If the wrong combination is used, the Wheatstone bridge will become unbalanced which will cause the ignition circuit to be broken and a warning device to operate as already described in connection with Fig. 1.

The combination lock switch 38 has a longitudinally and rotatably movable shaft 39 which has secured to one end a knob 40 and pointer 41 and the other end being journalled in the housing 42 and carries a rotatable disk 43. Journalled in the rear of the housing of the switch is a stub shaft 44 to which is secured a second rotatable disk 45. Between the disks 43 and 45 and carried by the bolts 46 and held in position by spacers 46ª is a stationary disk 47 of non-conducting material having extending therethrough brushes 48. The bolts 46 are used as terminals.

In order that the disks 43 and 45 will constantly engage the brushes 48 there is provided on the stub shaft 44 as well as the shaft 39 compression springs 49 and 50 which act against the housing of the switch to hold the disks against the brushes 48. Attached to the disks 43 and 45 are brushes 51 and 52 which are adapted to engage contacts 53 and 54 which are carried by a stationary disk 47 and held in place by the bolts 46 and spacers 46ª.

In the end of the shaft 39 is a key 39ª which normally engages the keyway 55 in the disk 43. In the stub shaft 44 is a similar keyway 56 which is engageable with the key 39ª when the shaft is moved inwardly. To operate the combination lock switch 38 the shaft 39 is pushed inwardly until the key 39ª disengages the keyway 55 in the disk 43 and engages the keyway 56 in the stub shaft 44. The shaft 39 is then rotated by the knob 40 until the pointer 41 points to a certain number on the dial 57. At this point the brush 52 on the disk 45 engages the contact 54 which closes part of the switch. The shaft is then moved outwardly to its original position so that the key 39ª engages the keyway 55 in the disk 43. The shaft is then rotated by the knob 40 until the pointer 41 is at a second predetermined number. At this point the brush 51 on the disk 45 engages the contact 53 on the disk 47. This closes the other half of the switch.

In order that there can be different combinations in the same switch, the disk 47 has a series of holes 58 therein through which the bolts 46 can pass. There are also corresponding holes (not shown) in the switch housing 38. By means of the holes in the disk 47 and the housing 38 the bolts 46 and contacts 53 and 54 can be moved to different places to give different combinations.

In practice the resistances in the Wheatstone bridge are different for different installations of the locking device so that the unbalancing of the Wheatstone bridge could not be avoided by a thief by using a bridging wire having the same resistance as the locked or inaccessible resistance of the Wheatstone bridge.

What I claim as my invention is:

1. Motor vehicle locking means, including an electric ignition circuit; a manually operated switch in the said circuit; a Wheatstone bridge including main branches and a cross branch, in shunt with the ignition circuit and normally in balance; and a relay in the cross branch of the bridge, the said ignition circuit being in series with the armature of said relay whereby the unbalancing of the bridge will energize the relay.

2. Motor vehicle locking means, including an electric ignition circuit; a manually operated switch in the said circuit; a Wheatstone bridge, including main branches and a cross branch, in shunt with the ignition circuit and normally in balance; a relay in the cross branch of the bridge, and a manually operated switch in one of the main branches of the Wheatstone bridge, whereby if the ignition current is energized without first closing the latter switch the relay will be actuated.

3. Motor vehicle locking means, including an electric ignition circuit; a manually operated switch in the said circuit; a Wheatstone bridge, including main branches and a cross branch, in shunt with the ignition circuit and normally in balance; a relay in the cross branch of the bridge, the armature of which is normally in series in the ignition circuit; and a manually operated switch in one of the main branches of the Wheatstone bridge, whereby if the ignition circuit is energized without first closing the latter switch the relay will be actuated to open the ignition circuit.

4. Motor vehicle locking means, including an electric ignition circuit; a manually operated switch in the said circuit; a Wheatstone bridge including main branches and a cross branch, in shunt with the ignition circuit and normally in balance; a second circuit normally open and including two main branches and the cross branch of the Wheatstone bridge; and a relay in the cross branch of the bridge, the armature of which is normally in series with the ignition circuit and is adapted to close the second circuit, the unbalancing of said bridge energizing said coil to cause the armature to open said ignition circuit and to close said second circuit, the said second circuit continuing to energize said coil.

5. Motor vehicle locking means including an electric ignition circuit; a manually operated switch in the said circuit; a Wheatstone bridge including main branches and a cross branch, in shunt with the ignition circuit and normally in balance; a second circuit normally open and including two main branches and the cross branch of the Wheatstone bridge; a relay in the cross branch of the bridge, the armature of which is normally in series with the ignition circuit and is adapted to close the second circuit, the unbalancing of said bridge energizing said coil to cause the armature to open said ignition circuit and to close said second circuit, the said second circuit continuing to energize said coil; and a switch in said second circuit to balance said circuit and de-energize the relay coil.

6. Motor vehicle locking means, including an electric ignition circuit; a manually operated switch in the said circuit; a Wheatstone bridge including main branches and a cross branch, in shunt with the ignition circuit and normally in balance; a relay in the cross branch of the bridge, the said ignition circuit being in series with the armature of said relay whereby the unbalancing of the bridge will energize the relay and open the ignition circuit; and a locked enclosure for at least one of the resistances of the Wheatstone bridge.

7. Motor vehicle locking means, including an electric ignition circuit; a manually operated switch in the said circuit; a Wheatstone bridge, including main branches and a cross branch, in shunt with the ignition circuit and normally in balance; a relay in the cross branch of the bridge, a second manually operated switch in one of the main branches of the Wheatstone bridge, whereby if the ignition circuit is energized without first closing the latter switch the relay will be actuated; and a single means for operating both of the above mentioned switches.

8. Motor vehicle locking means, including an electric ignition circuit; a manually operated switch; a lock for said switch, including a casing; a Wheatstone bridge including main branches and a cross branch, in shunt with the ignition circuit and normally in balance, one of the resistances of the Wheatstone bridge being contained within the lock casing; and a relay in the cross branch of the bridge, the said ignition circuit being in series with the armature of said relay whereby the unbalancing of the bridge will energize the relay and open the ignition circuit.

9. Motor vehicle locking means, including an electric ignition circuit; a manually operated switch in the said circuit; a Wheatstone brdge, including main branches and a cross branch, in shunt with the ignition circuit and normally in balance; a relay in the cross branch of the bridge, a manually operated combination lock switch in one of the main branches of the Wheatstone bridge, whereby if the ignition current is energized without first closing the latter switch the relay will be actuated; and a locked enclosure for at least one of the resistances of the Wheatstone bridge and the combination lock mechanism.

10. Motor vehicle locking means, including an electric ignition circuit; a manually operated switch in the said circuit; a Wheatstone bridge, including main branches and a cross branch, in shunt with the ignition circuit and normally in balance; a relay in the cross branch of the bridge, a manually operated combination lock switch in one of the main branches of the Wheatstone bridge, whereby if the ignition circuit is energized without first closing or crossing the combination switch the relay will be actuated, said combination switch having a support of non-conducting material, a plurality of contacts on opposite sides of said support with electrical connections between opposite contacts, a rotatable longitudinally movable shaft, a disk of conducting material engaging the contacts on one side of the support carried by the shaft and normally rotatable therewith, a second rotatable shaft, a second disk of conducting material carried by the second shaft and rotatable therewith, said second disk engaging the contacts on the other side of the support whereby the two disks are electrically connected, a contact engageable by the first disk when it is in a predetermined position, a second contact engageable by the second disk when it is in a predetermined position, whereby when each disk is in engagement with its corresponding contact an electrical circuit is completed through the disks between the two contacts, interengaging means on the two shafts and the first disk whereby when the longitudinally movable shaft is moved in the second shaft and disk may be rotated to a predetermined position and the first disk will not be rotated and when the longitudinally movable shaft is moved out the first disk will be rotated to a predetermined position and the second disk will not move.

11. Motor vehicle locking means, including an electric ignition circuit; a manually operated switch; a lock for said switch, including a casing; a Wheatstone bridge including main branches and a cross branch, in shunt with the ignition circuit and normally in balance, one of the resistances of the Wheatstone bridge being contained within the lock casing; a relay in the cross branch of the bridge, the said ignition circuit being in series with the armature of said relay whereby the unbalancing of the bridge will energize the relay and open the ignition circuit, the ignition lock including a barrel in the casing, fixed contacts in the ignition circuit, a fixed contact in the Wheatstone bridge circuit, and a longitudinally movable contact adapted to engage one of the fixed contacts and swingable contacts adapted to engage the other two contacts.

JOSEPH C. PROVAN.